April 7, 1964  R. DECHET  3,128,404
SEALED ELECTRIC MOTOR
Filed March 5, 1962
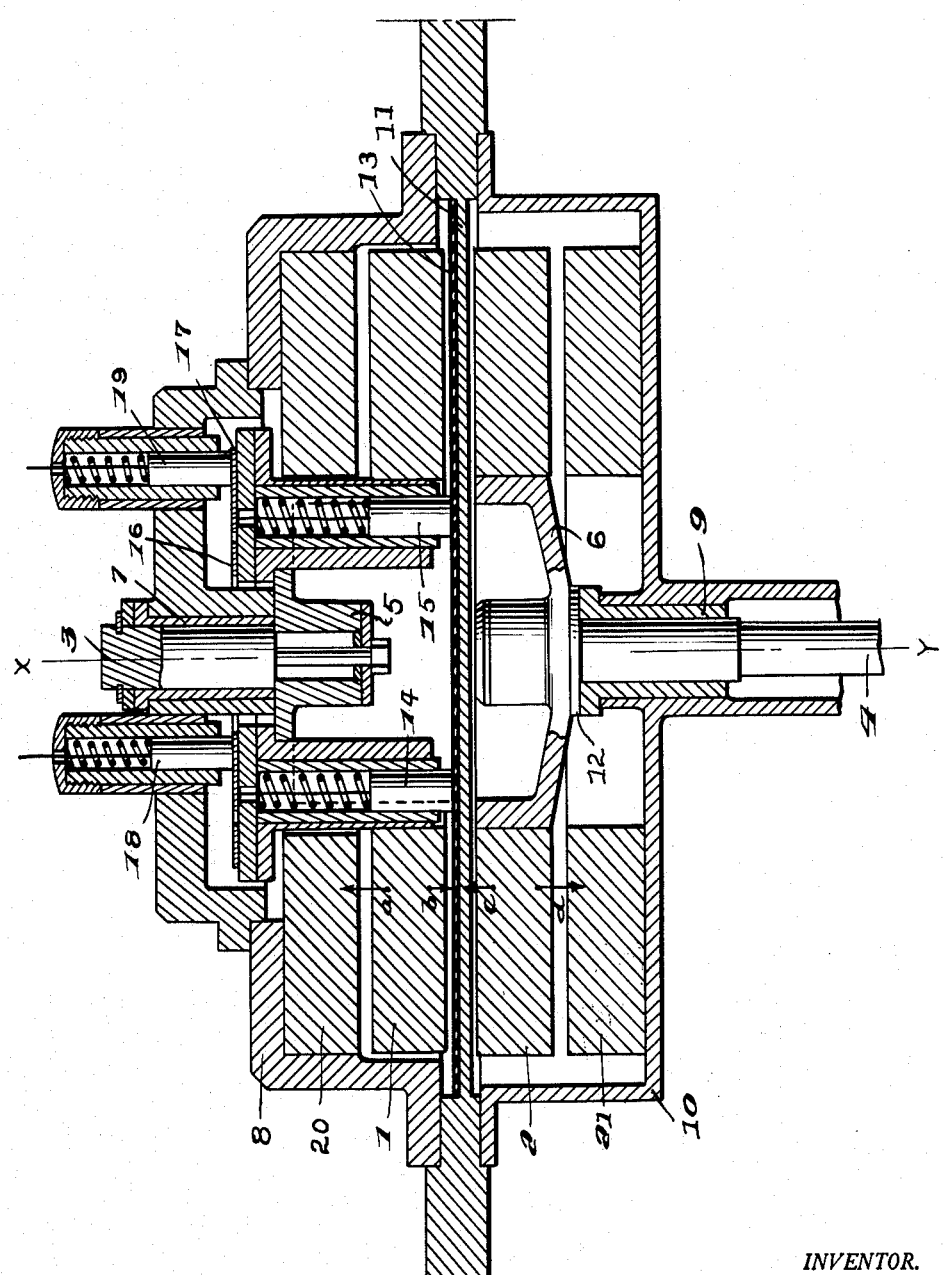
INVENTOR.
ROBERT DECHET,
BY
Pierce, Scheffler & Parker
ATTORNEYS

United States Patent Office 3,128,404
Patented Apr. 7, 1964

3,128,404
SEALED ELECTRIC MOTOR
Robert Dechet, Boulogne-sur-Seine, France, assignor to Cie Electro-Mecanique, Paris, France, a body corporate of France
Filed Mar. 5, 1962, Ser. No. 177,500
Claims priority, application France Mar. 30, 1961
3 Claims. (Cl. 310—268)

The present invention relates to electric motors and in particular to those of the sealed type operating on direct current, in which the inductor field is parallel to the axis of rotation and is produced by two rotating inductors which enclose a fixed, i.e. stationary armature component.

A motor construction of this type is known wherein the various components are mounted in two casings hermetically separated from each other by means of a fully non-magnetic partition. The stationary armature component which may be constituted by a thin disk of insulating material carrying on opposite faces thereof a flat coil with laminated conductors, can be supported by the partition member by securing it to one face of the partition member. Each casing contains one of the rotating inductors mounted on a shaft, these shafts being separated by the partition, and their axes being in alignment. In such two-part motors, the various electric and magnetic components can be selected and distributed in such manner that those grouped within one casing part can withstand the action of some fluid such as water in which this part of the motor must be present.

The rotating inductor components of the motor may be subjected to axial thrusts originating from the nature of the organs which constitute it and/or of the organ which it drives or of the fluid which it conveys. To compensate for these forces, a compensating device is disclosed in my co-pending United States application Serial No. 98,193, filed March 24, 1961, and which is also disclosed in French Patent No. 1,237,775. The purpose of the present invention is to provide for a simplification of the thrust compensating arrangement and is obtained by a novel arrangement of the active parts of the inductors. More particularly, the improved thrust compensation is characterized by the fact that the yokes of soft magnetic material, for example, soft ferrite, which serve to close the magnetic flux of each of the two rotating inductor elements are detached therefrom and rendered stationary. In the embodiment of the invention now to be described, and illustrated, the flux-closing yoke associated with each of the rotating inductor elements is secured, such as, for example, by gluing to the casing part in which the associated rotating inductor element is located.

The embodiment of the invention to be described is shown, by way of non-limitative example, in the attached drawing, the single view of which represents the improved motor complete in section along the axis of rotation.

With reference now to the drawing, the motor includes a pair of rotatable inductor members 1, 2 having a smooth toroidal configuration and made of a hard magnetic material, for example, hard ferrite each of which is magnetized in an axial direction to establish a ring of circumferentially spaced magnetic poles alternating in polarity. Inductor member 1 is secured fast to a rim 5 of non-magnetic material which in turn is secured fast to a shaft 3, and the latter is mounted for rotation in a bearing 7. All of these members are located within one casing 8. In a similar manner, inductor member 2 is secured fast to a rim 6 of non-magnetic material which in turn is secured fast to a shaft 4, and the latter is mounted for rotation in bearing 9. All of these members are located within the other casing 10.

The two casings 8 and 10, and hence the shafts 3, 4 and inductors 1, 2 are entirely separated from each other by means of a partition member 11 of non-magnetic material. The two casings are, of course, centered so that the axes of rotation of shafts 3, 4 coincide along a straight line X—Y, and can be held in that relationship by any suitable securing means, or simply by the magnetic attraction that exists between them. The gap between inductors 1 and 2 may be adjusted by means of a washer 12 of the desired thickness placed on shaft 4.

In the illustrated embodiment, the armature element 13 is secured to one face of the partition member 11 and is located within the casing part 8. This armature element is comprised of a thin disk of insulating material which carries on both sides thereof a flat coil composed of laminated conductors.

The rim 5 also carries rotating brushes 14, 15 and collector rings 16, 17. Brushes 14, 15 are electrically connected, respectively to collector rings 16, 17. The latter are brushed by fixed brushes 18, 19 mounted on casing 8 and serve to bring current from an external source, not shown, to rings 16, 17 and thence from the latter to brushes 14, 15 and thence to the bare coils on the face of the armature element 13 on which they slide.

For closing the magnetic flux of the multi-polar rotary annular inductor member 1, an annular yoke 20 is provided. This yoke is made of a soft magnetic material, for example, soft ferrite. The annular yoke 20 is stationary rather than rotary with the associated inductor 1 and is secured within the casing 8 in any suitable manner, such as by gluing to a face of the latter, concentric with its associated rotary inductor member 1, and with a small axial gap therebetween.

In a similar manner, another annular yoke 21 is provided for closing the magnetic flux of the multi-polar rotary annular inductor 2. Yoke 21 is identical in structure with yoke 20 and mounted in the same way in a stationary manner within the casing part 10.

Because of the high electric resistivity of the soft ferrite material from which the yokes 20, 21 are made, the variation of the magnetic flux due to rotation of inductors 1, 2 in relation, respectively to the fixed yokes 20, 21, produces in the latter Foucault currents, and hence, minimal losses. The improved arrangement of the flux-closing yokes 20, 21 involves necessarily, the introduction of small axial gaps to provide running clearance with respect to their associated rotary inductor members 1, 2. However, the adverse influence of these small gaps is weak. In fact, the improved arrangement of the yokes presents no appreciable drawback with respect either to the value of the magnetic flux or to the losses due to its variation. On the other hand, the structural advantages are numerous. In particular, there is no longer any need for providing a special abutment, which was previously necessary, when the yokes were part of the rotating inductor structure, to absorb axial thrusts and attractions and which, in a sealed construction, is often difficult to place. Another advantage is the corresponding reduction in moment of inertia of the rotating parts since the yokes no longer rotate. Further, it makes possible use of materials for the yokes offering a much greater resistance than that of soft steel toward active reagents of any kind. Also it facilitates the ease of balancing of the magnetic attractions, shown by the directional arrows a, b, c and d in the drawing, which exert themselves on the one hand between inductors 1 and 2 and, on the other hand, between the latter and the yokes 20, 21 solely by axial adjustment of the axial positions of the various toroidal elements present.

Provided that the adjustment is normal, there will as a general rule be no reaction due to the thrust or to the axial attraction, either on partition member 11 or on the bearings 7 and 9.

In conclusion, while one practical embodiment of the invention has been described and illustrated, it will be evident that various modifications may be made with respect to the construction and arrangement of the various component parts of the motor without, however, departing from the spirit and scope of the invention as defined in the appended claims.

I claim:

1. In a sealed direct current electric motor the combination comprising first and second casings mounted on opposite sides respectively of a partition member, a disc type armature member having a flat armature winding thereon secured to one face of said partition and located within the confines of said first casing, said first casing also enclosing a first annular inductor member of magnetic material establishing a ring of circumferentially spaced magnetic poles alternating in polarity and having one side thereof confronting said armature winding, brush means within said first casing engaging said armature winding, means mounting said first annular inductor member adjacent said armature and said brush means for rotation, a first stationary annular yoke member arranged concentrically with and adjacent the opposite side of said first annular inductor member within said first casing, said second casing enclosing a second annular inductor member of magnetic material establishing a ring of circumferentially spaced magnetic poles alternating in polarity and having one side thereof confronting the opposite face of said partition, means mounting said second annular inductor member for rotation about an axis coincident with the axis of rotation of said first inductor member, and a second stationary annular yoke member arranged concentrically with and adjacent the opposite side of said second annular inductor member within said second casing, the magnetic attractive forces existing between said first and second annular inductor members being counterbalanced by the opposite directed magnetic attractive forces existing respectively between said first annular inductor member and the associated first annular yoke member and between said second annular inductor member and its associated second annular yoke member.

2. A sealed direct current motor as defined in claim 1 wherein said first and second annular yoke members are secured in place within their respective casings by an adhesive material.

3. A sealed direct current motor as defined in claim 1 wherein said first and second annular yoke members are made from a soft ferrite.

References Cited in the file of this patent

UNITED STATES PATENTS

| | | |
|---|---|---|
| 2,534,520 | Katcher | Dec. 19, 1950 |
| 2,970,238 | Swiggett | Jan. 31, 1961 |